United States Patent
Schonhorst et al.

(10) Patent No.: US 7,422,266 B2
(45) Date of Patent: Sep. 9, 2008

(54) CABRIOLET VEHICLE WITH COVER SUPPORT STRAP

(75) Inventors: Heiko Schonhorst, Westerkappeln (DE); Klaus Licher, Georgsmarienhutte (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 10/596,248

(22) PCT Filed: Nov. 27, 2004

(86) PCT No.: PCT/DE2004/002630

§ 371 (c)(1),
(2), (4) Date: Oct. 26, 2006

(87) PCT Pub. No.: WO2005/056324

PCT Pub. Date: Jun. 26, 2005

(65) Prior Publication Data

US 2007/0187983 A1    Aug. 16, 2007

(30) Foreign Application Priority Data

Dec. 6, 2003    (DE) .............................. 103 57 101

(51) Int. Cl.
*B60J 7/12* (2006.01)
(52) U.S. Cl. .................... 296/107.12; 296/136.12; 296/219
(58) Field of Classification Search ............ 296/100.15, 296/107.01, 107.06, 107.09, 107.11, 107.12, 296/116, 136.12, 219, 121; 24/192, 200, 24/265 C, 265 R, 460, 701
See application file for complete search history.

(56) References Cited

U.S. PATENT DOCUMENTS

| | | | | | |
|---|---|---|---|---|---|
| 1,298,836 | A | * | 4/1919 | Vetter | 296/135 |
| 1,365,010 | A | * | 1/1921 | Tabler | 24/200 |
| 2,622,663 | A | * | 12/1952 | Burd | 160/371 |
| 2,765,192 | A | * | 10/1956 | Blake | 296/107.01 |
| 2,798,763 | A | * | 7/1957 | Milan | 296/107.07 |
| 3,090,646 | A | * | 5/1963 | Johnson | 296/107.11 |
| 3,200,676 | A | * | 8/1965 | Pagel | 81/64 |
| 4,209,196 | A | * | 6/1980 | Mocelin | 296/219 |
| 4,475,764 | A | * | 10/1984 | Hutchinson et al. | 296/136.11 |
| 5,058,943 | A | * | 10/1991 | Louderback | 296/107.09 |
| 5,253,915 | A | * | 10/1993 | Schnader et al. | 296/107.12 |
| 5,318,348 | A | * | 6/1994 | Hess | 297/440.11 |
| 5,375,901 | A | * | 12/1994 | Agosta et al. | 296/146.14 |
| D369,076 | S | * | 4/1996 | Alexander | D8/22 |
| 5,511,844 | A | * | 4/1996 | Boardman | 296/107.11 |
| 5,540,476 | A | * | 7/1996 | Cowsert | 296/107.11 |

(Continued)

FOREIGN PATENT DOCUMENTS

DE       3907228 C1    4/1990

(Continued)

*Primary Examiner*—D. Glenn Dayoan
*Assistant Examiner*—Paul A Chenevert
(74) *Attorney, Agent, or Firm*—Quinn Law Group, PLLC; Christopher W. Quinn

(57) ABSTRACT

A convertible vehicle with a moving roof having a flexible cover, in which the cover is engaged underneath by at least one strap (9), following essentially the course of the roof when the roof is closed, which is secured on support structure arranged across the roof. The at least one end of the strap passes through a slit recess of the roof support structure and is secured against pulling out from the slit recess by an end thickening.

14 Claims, 2 Drawing Sheets

U.S. PATENT DOCUMENTS

| | | | | |
|---|---|---|---|---|
| 5,716,101 | A * | 2/1998 | Frinier et al. | 297/440.22 |
| 5,887,936 | A | 3/1999 | Cowsert | |
| 6,199,936 | B1 * | 3/2001 | Mac Farland | 296/116 |
| 6,260,904 | B1 * | 7/2001 | Hartmann et al. | 296/107.01 |
| 6,302,471 | B1 * | 10/2001 | Windpassinger et al. | 296/107.11 |
| 6,318,791 | B1 * | 11/2001 | Pfertner | 296/107.06 |
| 6,588,827 | B2 * | 7/2003 | Heiland | 296/136.1 |
| 6,789,450 | B1 * | 9/2004 | Helfet | 81/64 |
| 7,147,265 | B1 * | 12/2006 | Schmeichel | 296/100.14 |
| 2002/0092381 | A1 * | 7/2002 | Khubani | 81/64 |
| 2007/0182199 | A1 * | 8/2007 | Just | 296/107.01 |
| 2008/0074895 | A1 * | 3/2008 | Halbweiss et al. | 362/490 |

FOREIGN PATENT DOCUMENTS

DE 3907229 C1 4/1990

* cited by examiner

CABRIOLET VEHICLE WITH COVER SUPPORT STRAP

CROSS-REFERENCE TO RELATED APPLICATION(S)

This application is a US National Phase of International Application No. PCT/DE 2004/002630, filed Nov. 27, 2004, which claims priority to German 103 57 101.9, filed Dec. 6, 2003. The entire contents of the above identified applications are incorporated herein by reference.

TECHNICAL FIELD

The invention concerns a convertible vehicle with a movable roof having a flexible cover, according to the main concept of Claim 1.

BACKGROUND OF THE INVENTION

It is known in convertible vehicles with flexible roof coverings, for example, those made of textile materials or plastics, to provide straps that engage beneath the roof cover and therefore support it during roof opening into the desired type of folding. Such straps can be attached to rod parts of the roof and extend, for example, from the rear clip to a front transverse support of the roof, the so-called roof strut. In previous solutions, the straps are tightened on their ends with the corresponding roof rod parts. The screw(s) pass(es) through the strap, which, like a safety belt, has a fiber structure to ensure high and permanent tensile strength. However, damage to this structure occurs with the screw passing through, so that the material can fray and is weakened when the screw(s) is/are attached.

SUMMARY OF THE INVENTION

The underlying problem of the invention is to improve strap fastening to rod parts on the roof.

The invention solves this problem by a convertible vehicle with the features of Claim 1 and by a movable vehicle roof with the features according to Claim 9. In regard to additional advantageous embodiments of the invention, Claims 2 through 8 are referred to.

With the invention, the strap need not be perforated and damaged for its attachment to a roof rod part. A reliable resistance against pulling out of the strap through the slit recess is provided by the end thickening.

The end thickening advantageously extends over the entire width of the strap and therefore lies against the slit recess when a tensile force is introduced.

A very efficient and simple abutment is achieved when the end thickening is formed by a piping.

In particular, a widening can be provided on at least one end area of the slit recess, to that the piping or similar end thickening can be made perpendicular to the securing position after assembly. The strap can therefore also be released again in a simple manner in the relaxed state, for example, when (partial) restoration of the roof is to be performed.

If the widening is dimensioned only slightly larger than the diameter of the end thickening, on the other hand, unintentional loosening, for example, also by occupants acting improperly, can be reliably avoided, which becomes significant, in particular, in unlined convertible tops, if the straps are accessible from the interior.

Two straps are advantageously provided, which can be fastened in the manner according to the invention, at least on the roof strut.

Further advantages and features of the invention can be seen from a practical example of the object of the invention, described below and shown at least schematically in the drawings.

DESCRIPTION OF THE PREFERRED EMBODIMENTS

Figure 1:
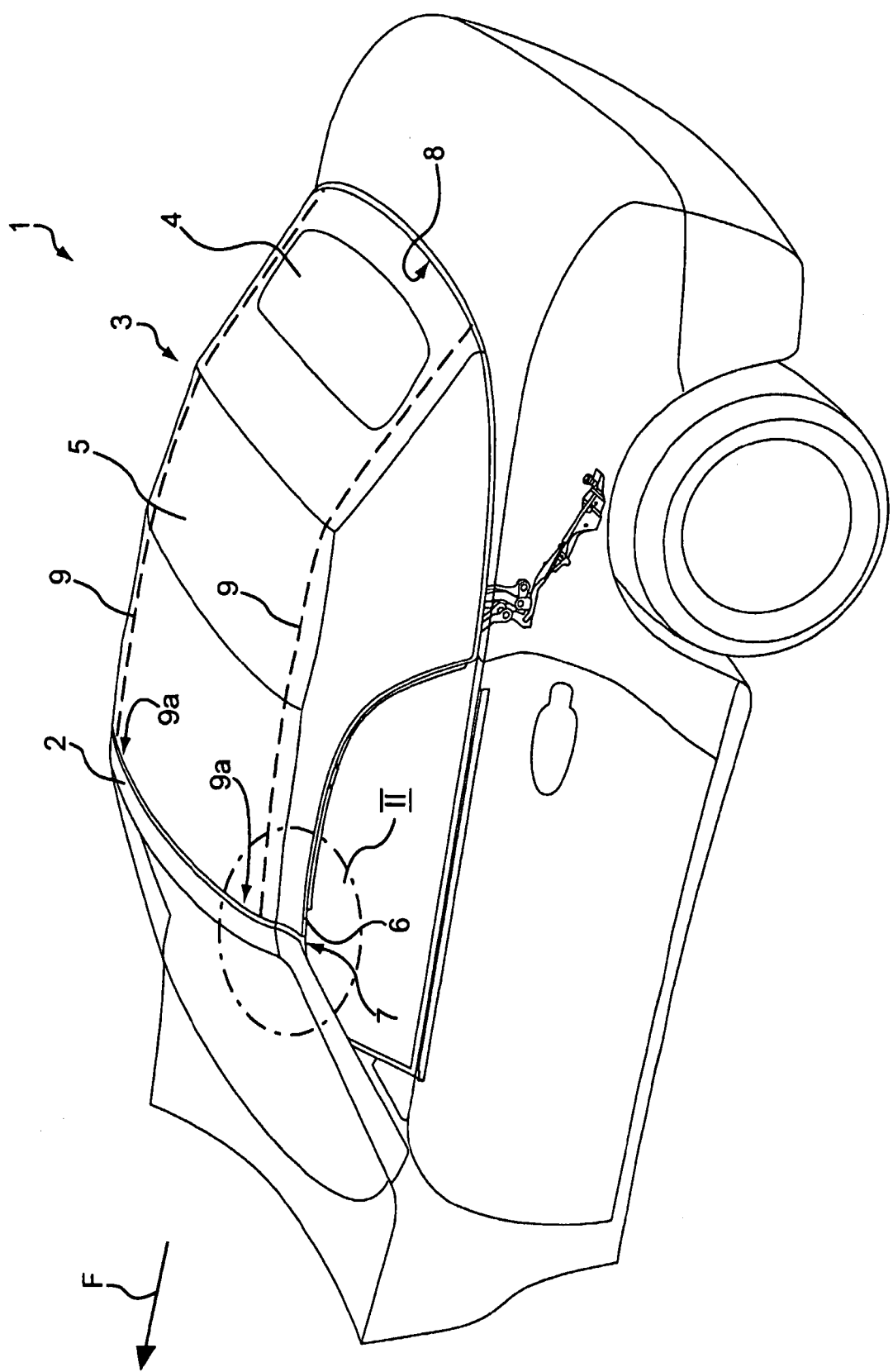
FIG. 1 shows a vehicle according to the invention in a perspective view, obliquely from the rear, with a completely closed roof.

A two-seat vehicle 1 of the roadster type is generally shown in the drawing figures. This is not essential. For example, a four- or five-seat convertible vehicle provided with rear seats can also be constructed according to the invention.

The vehicle 1 includes a moving roof in its upper area, directly or indirectly bordering a windshield frame 2 that includes a convertible top rear window 4 and a flexible roof cover 5 outside of it, which can be made of a textile or plastic. This can be placed over a roof rod with one or more transverse bows (not shown individually) and attached to them.

The cover 5 extends here beyond a top rear window 4 over the entire roof 3, which is not essential. Also, only a partial area of the roof 3 can be provided with a flexible cover 5 and another part, for example, with rigid plate parts.

Figure 2:
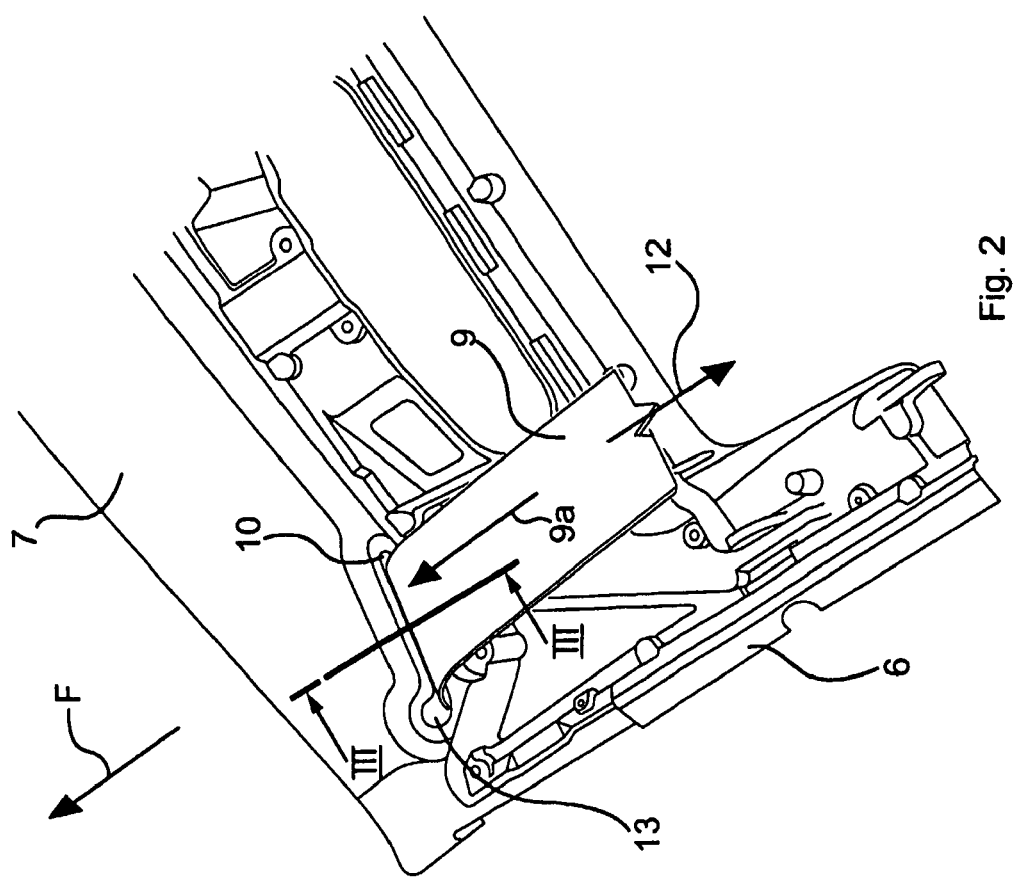
FIG. 2 shows a view of an edge area of the roof strut with the strap fastened to it, roughly corresponding to detail II in FIG. 1, shown without the cover in the interest of better clarity.

Of the roof rods, only one front area of a side frame part 6 and the left end of a transverse support structure that forms the roof strut 7 are shown in FIG. 2, with reference to the direction of travel F.

The roof cover 5 can be tightened, for example, between this roof strut 7 and a rear clip 8 beneath the top rear window 4 (FIG. 1). The clip 8 here lies on a cover part of the auto body when the roof 3 is closed. Instead of clip 8, in another type of folding, a direct body connection of the rear end of the cover 5 is also possible. An entirely different roof shape, for example, with two lateral struts emerging rearward, so-called fins, can also be provided, to which a convertible top rear window is assigned.

In order to achieve a smooth and defined position of the roof cover 5 in the open state, and to limit its tension in the closed state, it is engaged underneath by two straps 9 running at least essentially in the longitudinal direction of the vehicle, shown in FIG. 1 with dashed lines. These straps 9, with their front ends 9a, pass through slit recesses 10 of the roof strut 7, in which engagement occurs from above in the practical example, which is not essential, depending on the design of the roof strut 7. On the other side of the plane of strap 9, which here lies above roof strut 7, an end thickening 11 is provided, which prevents the strap end 9a, secured in this manner, from being pulled out through the slit recess 10.

The slit recess 10 extends essentially perpendicular to the travel direction F, whereby a slightly oblique position is envisioned here, so that the slit 10 runs in the pulling direction 12 of strap 9 from a lateral widening 13 with a component in this pulling direction 12, i.e., against the travel direction. The strap 9 is therefore pulled into the slit recess 10 during the pulling in a direction slightly away from the widening 13 and therefore additionally secured.

The widening 13 has an essentially round contour, whose diameter only slightly exceeds that of the end thickening 11, so that it is prevented from undesired pulling through the widening 13.

To install strap 9, it is threaded through the widening 13 with its end thickening 11 in a tension-free state. The end thickening 11 is then placed parallel in front of the slit recess 10, which is narrow in comparison to the end thickening 11, and it can be loaded under tension in the direction of arrow 12, due to this forced securing.

Figure 3:
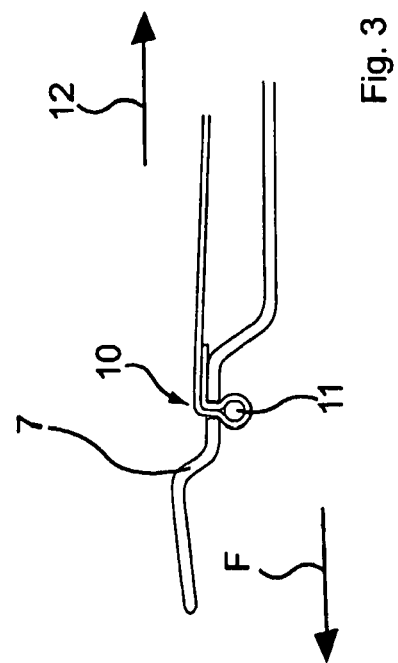
FIG. 3 shows a section along line III-III in FIG. 2.

The end thickening 11 is formed here by one loop of the strap end 9a with internal piping (FIG. 3), in which the parts of the loop are held to each other by gluing, welding, hot gluing and/or stitching, for example. The strap end 9a, in the installed state, is secured only by the slit recess 10 and an additional securing, for example, by screwing or riveting, is completely unnecessary. The strap can therefore be attached without mechanical damage, especially by holes, which improves its lifetime and also permits disassembly and reassembly.

The rear strap end can likewise be secured on an additional rod part, for example, the rear clip 8.

The invention is applicable both to vehicles with a roof 3 to be moved manually and to those with full or partially automatic movement.

It is not essential that the straps 9 pass beneath the cover 5 over its entire length. Straps extending only over partial areas are also possible.

While the best modes for carrying out the invention have been described in detail, those familiar with the art to which this invention relates will recognize various alternative designs and embodiments for practicing the invention within the scope of the appended claims.

The invention claimed is:

1. A convertible vehicle (1) with a moving roof (3) having a flexible cover (5), in which the cover (5) is engaged underneath by at least one strap (9), following essentially the course of the roof when the roof (3) is closed, which is secured on support structure (7; 8) arranged across the roof (3),
   an end (9a) of the at least one strap (9) passes through a slit recess (10) of said support structure (7; 8) and is secured against pulling out from the slit recess by an end thickening (11) on the at least one strap (9),
   characterized in that the slit recess (10) has a widening (13) on one end that receives the end thickening (11) for installation.

2. A convertible vehicle (1) according to claim 1, characterized in that the end thickening (11) is formed by a loop of the strap (9) stitched around and enclosing a piping.

3. A convertible vehicle (1) according to claim 1, characterized in that the widening (13) has an essentially round shape with a diameter only slightly greater than that of the end thickening (11).

4. A convertible vehicle (1) according to claim 1, characterized in that a strap (9) is assigned to each side of the vehicle.

5. A convertible vehicle (1) according to claim 1, characterized in that said at least one strap (9) is free of holes.

6. A convertible vehicle (1) according to claim 1, characterized in that the front and rear strap ends (9a) are fastened the same way to different support structure (7, 8) of the roof (3).

7. A moving roof (3) for a convertible vehicle (1) according to claim 1.

8. A convertible vehicle (1) according to claim 1, characterized in that said slit recess (10) is arranged in a front transverse support of said roof support structure.

9. A convertible vehicle (1) according to claim 8, characterized in that said front transverse support of said roof support structure is further defined as a roof strut (7).

10. A roof (3) for a convertible vehicle (1) comprising:
    a flexible cover (5);
    at least one strap (9) engaging said flexible cover (5) with said at least one strap extending to an end (9a);
    an end thickening (11) at said end (9a) of said at least one strap (9) with said end thickening (11) being thicker than said end (9a) of said at least one strap (9);
    a roof strut (7) defining a slit recess (10) for receiving said end (9a) of said at least one strap (9); and
    said roof strut (7) defining a widening (13) opening to said slit recess (10) with said widening (13) being wider than said slit recess (10) and wider than said end thickening (11) for receiving said end thickening (11).

11. A roof (3) as set forth in claim 10 wherein said slit recess (10) is offset from said widening (13).

12. A roof (3) as set forth in claim 10 wherein said at least one strap (9) and said end (9a) extend parallel to a direction of travel (F) and said at least one strap (9) and said slit recess (10) extend in an oblique direction relative to said direction of travel (F).

13. A roof (3) as set forth in claim 12 wherein said oblique direction is further defined as being transverse to said direction of travel (F) but not perpendicular to said direction of travel (F).

14. A roof (3) as set forth in claim 12 wherein said widening (13) is further defined as extending toward said direction of travel (F) and said slit recess is further defined as extending toward said pulling direction (12).

* * * * *